United States Patent [19]
Berteau

[11] Patent Number: 5,898,839
[45] Date of Patent: Apr. 27, 1999

[54] SYSTEM USING SIGNALING CHANNEL TO TRANSMIT INTERNET CONNECTION REQUEST TO INTERNET SERVICE PROVIDER SERVER FOR INITIATING AND INTERNET SESSION

[75] Inventor: C. Donald Berteau, Sebastian, Fla.

[73] Assignee: Geonet Limited, L.P., Eugene, Oreg.

[21] Appl. No.: 08/818,285

[22] Filed: Mar. 17, 1997

[51] Int. Cl.⁶ .................................................. G06F 13/00
[52] U.S. Cl. ................................ 395/200.57; 395/200.58; 395/188.01
[58] Field of Search .................................... 370/351, 401, 370/259; 395/200.58, 200.49, 200.57, 188.01; 345/302; 377/2

[56] References Cited

U.S. PATENT DOCUMENTS

| | | | |
|---|---|---|---|
| 3,852,575 | 12/1974 | Daniels et al. | 377/2 |
| 4,949,248 | 8/1990 | Caro | 395/200.33 |
| 4,979,118 | 12/1990 | Kheradpir | 701/117 |
| 5,021,949 | 6/1991 | Morten et al. | 395/200.61 |
| 5,073,890 | 12/1991 | Danielsen | 370/270 |
| 5,142,624 | 8/1992 | Patrick, II | 395/200.56 |
| 5,237,561 | 8/1993 | Pyhalammi | 370/244 |
| 5,259,026 | 11/1993 | Johnson | 379/207 |
| 5,282,244 | 1/1994 | Fuller et al. | 379/230 |
| 5,528,677 | 6/1996 | Butler et al. | 379/196 |
| 5,602,991 | 2/1997 | Berteau | 395/200.57 |
| 5,610,910 | 3/1997 | Focsaneanu et al. | 370/351 |
| 5,611,038 | 3/1997 | Shaw et al. | 345/302 |
| 5,754,784 | 5/1998 | Garland et al. | 395/200.49 |
| 5,764,639 | 6/1998 | Staples et al. | 370/401 |
| 5,768,262 | 6/1998 | Hallock et al. | 370/259 |
| 5,768,525 | 6/1998 | Kralowetz et al. | 395/200.58 |

FOREIGN PATENT DOCUMENTS

| | | |
|---|---|---|
| 0358408 | 3/1990 | European Pat. Off. . |

OTHER PUBLICATIONS

Apers, Peter M.G., "Data Allocation in Distributed Database Systems", ACM Transactions on Database Systems, vol. 13, No. 3, Sep. 1988, pp. 267–304.

Bernstein et al., Philip A., "Query Processing in a System for Distributed Databases (SDD–1)", ACM Transactions on Database System, vol. 6, No. 4, Sep. 1981, pp. 602–625.

Desai, Samir A., "Using Object–Oriented Distributed Technologies in Operations Systems", Annual Review of Communications, 1993–94, pp. 818–825.

(List continued on next page.)

*Primary Examiner*—Le Hien Luu
*Attorney, Agent, or Firm*—Jones, Tullar & Cooper, PC

[57] ABSTRACT

A system and method for managing access to the Internet substantially reduces connection time between an Internet service provider (ISP) server and a user by processing user logon and information requests through signaling links or channels of an intelligent telecommunications network, such as Signaling System 7 (SS7). An ISP access manager receives logon and information requests from the user through the signaling link (e.g., ISDN D channel), and instructs the ISP server to process the requests. Once the server processes a information request by retrieving requested information from a World Wide Web (WWW) site, the ISP access manager causes the ISP server to be connected to the user's computer through a transmission link or channel (e.g., ISDN B channel), and the server downloads the retrieved information to the user. The ISP access manager causes the transmission link to be disconnected if the user does not request additional information within a predetermined time interval after information has been downloaded for a previous request. As soon as the user requests additional information, the ISP access manager causes the transmission link to be reestablished when the server is ready to download the requested information to the user. This arrangement eliminates transmission link connect time during logon processing, retrieval of requested information by the server from remote sites, and when a user is reviewing previously downloaded information, thus substantially reducing the transmission link connect time during the user's session.

20 Claims, 1 Drawing Sheet

OTHER PUBLICATIONS

Federal Communications Commission (FCC), Supplementary Comments filed by BellSouth dated Jul. 7, 1993 under CC Dkt. No. 91–346.

Geonet Limited, L.P., International Search Report, PCT/US95/01387, dated Jun. 28, 1995, 4 pgs.

Gerner, Nina, "Intelligenztest erfolgreich bestanden", Telcom Report (Siemens) 16 (1993) Jul./Aug., No. 4, Munchen, DE, pp. 204–207 (Translation Attached).

Graetz, Ingeborg et al., "IN and CSTA—two sides of the same coin?", International Switching Symposium, vol. 2, Oct. 1992, pp. 33–38.

Kato, Toshihiko, et al., "Applying Distributed Processing Technologies of Intelligent Network", IEICE Transactions, vol. E74, No. 11, Nov. 1991, pp. 3672–3680.

Knowledge–Driven Distributed Information Systems by Papazoglous, 1990 IEEE Publication pp. 671–679.

Knowledge based Architecture to Integrate Heterogeneous Disbritubed Information Systems, IEEE 1990 Publication, pp. 682–689, Bernus et al.

Sinnadurai, F.N. et al., "Service Management Systems", British Telecommunications Engineering, vol. 10, Oct. 1991, pp. 180–186.

SYSTEM USING SIGNALING CHANNEL TO TRANSMIT INTERNET CONNECTION REQUEST TO INTERNET SERVICE PROVIDER SERVER FOR INITIATING AND INTERNET SESSION

BACKGROUND OF THE INVENTION

The present invention relates in general to a system and method for providing user access to the Internet which maximize efficiency in the use of telecommunications resources.

Access to the Internet is generally accomplished through an Internet access service provided by an organization called an Internet Service Provider (ISP). The ISP provides the network interface and computer service functions which enable the user or subscriber to establish a connection to the Internet, and request and receive information from Internet World Wide Web (WWW) sites.

The rapid increase in use and popularity of the Internet has created a problem in the telecommunications network. In particular, the present telecommunications infrastructure is not engineered for the long holding times of telephone calls which interconnect the users to the ISP. These calls tie up telephone subscriber lines, central office switch resources and network trunk lines for durations which are many times greater than the average durations for which the infrastructure was designed. According to industry reports, the increasing volume of Internet access calls results in a degradation of service to other telephone system users.

Some solutions have been recommended which would require a completely new network overlaid over the present telephone network to handle Internet access calls separately from other telephone calls. Unfortunately, such solutions are not particularly attractive or feasible because they would require a large capital investment in new telecommunications network infrastructure.

SUMMARY OF THE INVENTION

The present invention provides a solution to the aforementioned problem through provision of a system and method for providing Internet access which substantially reduce the burden on existing telecommunications network resources without requiring the addition of new network resources. This is accomplished through use of an ISP access manager computer or software module in combination with a conventional intelligent telecommunications network, such as a SS7 signaling network, which includes dedicated links or channels for signaling. In networks employing an SS7 signaling network, ISDN B channels are employed as transmission links for communicating voice and digital data, including the type of data communicated between an Internet user or subscriber and an ISP, while ISDN D channels are employed as signaling links for communicating signaling information among the various nodes or central offices and subscribers in the network. To minimize actual connect time between the ISP and the Internet users through the transmission link or channel, the system and method of the present invention makes advantageous use of the signaling links to communicate Internet connection and information requests from a user to an ISP without first establishing a transmission link connection between the two. With this arrangement, total connection time through the transmission link during an Internet session is substantially reduced, thereby reducing the burden imposed by the Internet users on the telecommunications network.

The ISP access manager computer is either formed integrally with, or interfaced to, a dedicated service control point in the intelligent telecommunications network which receives user requests over the signaling links. The ISP access manager is programmed to manage the user connection requests in the following manner. When a user requests initiation of an Internet session through the ISP by entering a user ID and password, a connection request is transmitted over the signaling link through the network to the ISP access manager for special processing. At this point, either the ISP server or the ISP access manager processes the logon request by validating the user ID and password.

Next, if the user has already requested, or when the user requests, information (e.g., HTML data or FTP file transfer from a WWW site), the ISP server retrieves the requested information from the designated site. Once the ISP server has retrieved the requested information, the ISP access manager establishes a connection of one or more transmission links between the user and the server's next available port, and the requested HTML data is downloaded from the ISP server to the user's computer.

To save additional connect time, the ISP access manager monitors the user activity through a browser program installed on the user's computer and disconnects the transmission link if the user does not request additional information from the ISP server within a specified time interval. The transmission link connection is reestablished if the user requests additional information by transmitting the appropriate request to the ISP access manager through the signaling link. This procedure is repeated throughout the user's Internet session, thereby substantially reducing the actual time during which the user's computer is connected through the transmission link to the ISP server.

BRIEF DESCRIPTION OF THE DRAWINGS

The features and advantages of the present invention become apparent from the following detailed description of a preferred embodiment thereof, taken in conjunction with the accompanying drawing figure, FIG. 1, which is a block diagram illustrating the telecommunications network architecture for a preferred embodiment of the present invention.

DETAILED DESCRIPTION OF THE PREFERRED EMBODIMENT

Figure 1:
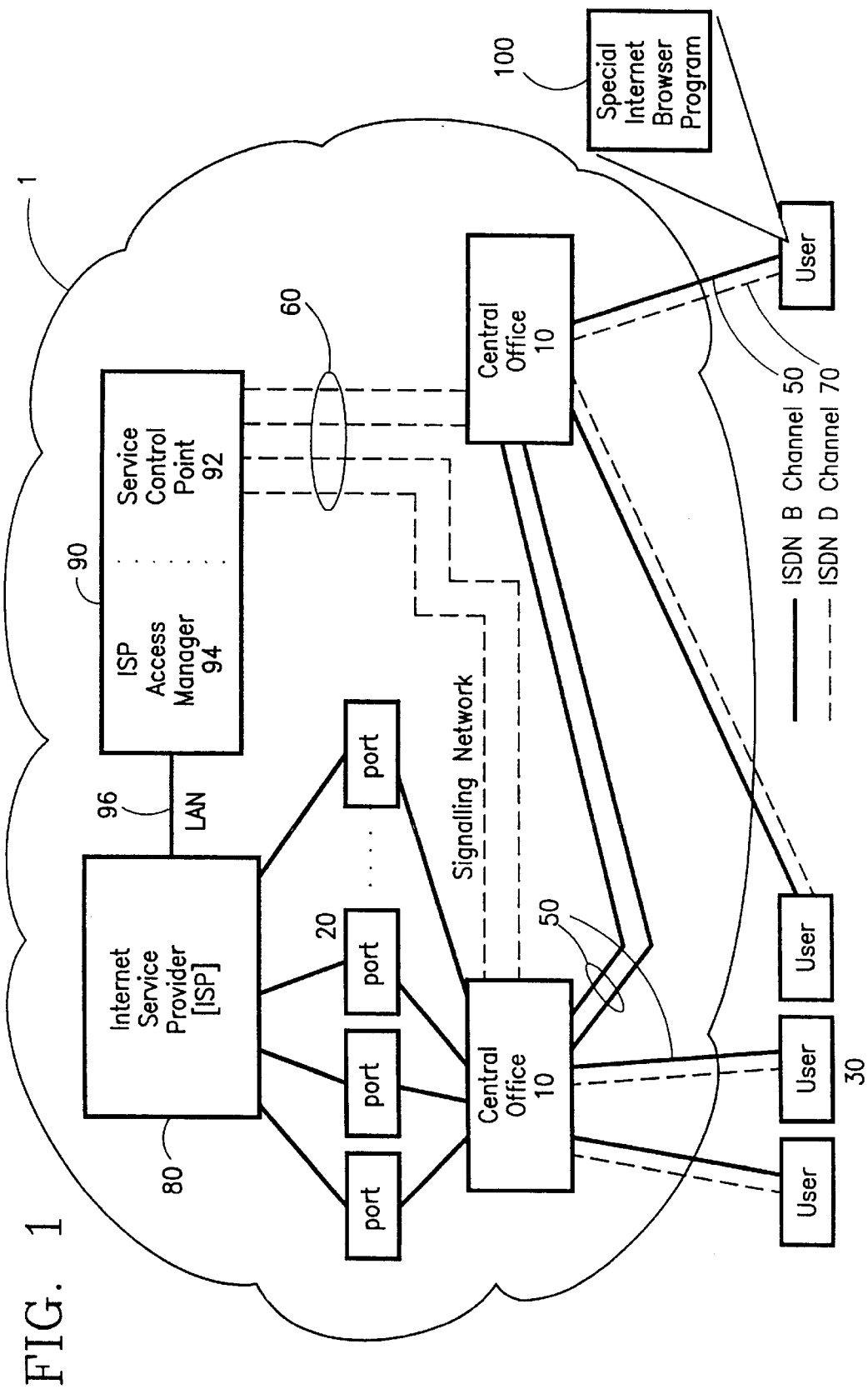

The present invention employs similar principles to those employed by the inventions disclosed in Applicant's previously issued patents, U.S. Pat. Nos. 5,423,003 and 5,602,991, both entitled "System for Managing Networked Computer Applications", and these patents are hereby incorporated by reference. These patents disclose systems and associated methods which employ an application manager computer interfaced to a service control point (SCP) of an intelligent network, such as an SS7 signaling network, to instruct the SCP to connect a plurality of remotely located applications computers in a most efficient manner. The present invention employs similar principles wherein a dedicated SCP controls connections of an Internet Service Provider (ISP) server to subscriber or user computers through use of an ISP access manager computer or software module that is either interfaced to, or integrally formed with, the SCP, and provides transmission link connection instructions to the SCP which result in a most efficient use of the telecommunications network.

With reference to FIG. 1, a block diagram of a telecommunications network architecture 1 is illustrated which is configured in accordance with a preferred embodiment of the present invention. The network architecture 1 is comprised of a number of conventional switching and process nodes including a plurality of central offices 10, ISP computer system interface ports 20 and user or subscriber computers 30. These elements are interconnected by a conventional intelligent communications network comprised of a plurality of ISDN B channel transmission links or channels 50, a conventional SS7 signaling network 60, and a plurality of ISDN D signaling channels 70. An ISP server computer 80 is accessed by the user computers 30 through the transmission links 50 and the ports 20.

A very important element of the network architecture 1 is an ISP access manager computer 90 which preferably comprises a conventional intelligent network SCP 92 that has been modified with a special access manager 94 to facilitate the exchange of the queries, messages and commands that are necessary to establish interconnection of the transmission links 50 between the users 30 and the ISP server interface ports 20. Preferably, the access manager is a software module formed integrally with the SCP 92. Alternatively, the access manager 94 can be formed as a separate computer which is interfaced between the SCP 92 and the ISP server 80. The programming of the access manager 94 provides the ISP access manager computer 90 with the ability to establish and disestablish the B channel transmission links 50 between the users 30 and the interface ports 20 in a manner which will allow better sharing of these elements. Typically, the ISP access manager computer 90 is located on the same premises as the ISP server 80, and is interfaced thereto by any suitable means, such as through a Local Area Network (LAN) connection 96.

With reference now to the specific manner in which the preferred embodiment operates, the ISP server 80, ISP access manager computer 90 and a special Internet browser program 100 that is installed on each of the user's computers 30, intercommunicate with one another to manage the establishment and disestablishment of the connections between the user computers 30 and the ISP interface ports 20 through the transmission links or channels 50. To initiate an Internet session, a user activates the Internet browser program 100. The Internet browser program 100 prompts the user for their user ID and password, and sends a connection request message, including the user ID and password data, over the ISDN D signaling channel 70 to the corresponding central office 10. Each of the central offices 10 is programmed in accordance with the Advanced Intelligent Network (AIN) functions and capabilities. Normally, the central office 10 processes connection request messages and establishes the required B channel transmission links to complete the calls. However, in the preferred embodiment of the present invention, information (e. g., the telephone number of the ISP server 80) is contained in the connection request message which causes the central office 10 to divert the message directly to the ISP access manager computer 90 for special processing.

Once the connection request message is received, the ISP access manager 94 communicates with the ISP server 80 to determine whether the user ID and password are valid, and whether the user has an active account. Alternatively, the ISP access manager 94 can be programmed to process the user ID and password information itself. The ISP access manager computer 90 then returns messages to the user computer 30 via the ISDN D channel 70 which indicate successful logon or invalid password or ID, thereby resulting in the appropriate prompt by the browser 100 for user action.

If the logon is successful, the user may then enter an information (e.g., HTML data, FTP file transfer, etc.) request which is passed to the ISP server 80 by the ISP access manager 94. After the ISP server 80 retrieves the requested HTML or other data from the appropriate WWW site, the ISP access manager computer 90 instructs the central office 10 to establish one or more of the B channel transmission links 50 between the user and the next available one of the ports 20, and communicates with the ISP server 80 that the connection has been made. Next, the requested HTML or other data is downloaded from the ISP server 80 through the one or more B channel transmission links 50 to the user's computer 30 for review by the user.

Once the requested data has been downloaded and is being reviewed by the user, the ISP access manager 94 monitors the B channel connection time, and causes the B channel transmission link 50 be disconnected if the user does not request additional information within a specified time interval. This greatly reduces B channel connect time when, for example, a user spends an extended period of time reviewing the previously downloaded information. The specified time interval may be selected to be any suitable value (e.g., 30 seconds, 1 minute, 2 minutes, etc.) which balances the trade off between connect time savings and transmission link disconnect/reconnect processing to avoid having to disconnect and reconnect the transmission link too often. In addition, the ISP access manager 94 can be programmed to assign different disconnect time intervals to the different users based on user Internet usage profiles, for example, which are stored in a look up table in the access manager 94.

When the user requests downloading of additional information from the ISP server 80, the Internet browser program 100 sends the request to the ISP access manager 94, and the ISP server 80 retrieves the requested information from the WWW. The ISP access manager computer 90 then causes, through the central office 10, one of the B channel transmission links 50 to be quickly reestablished between the user and the next available port, and communicates to the ISP server 80 that the connection has been made so that the ISP server 80 can download the retrieved information to the user computer 30. This connection and disconnection process is repeated until the user logs off, at which point the ISP access manager 94 will terminate the user's session. It should be noted that as long as the user has not formally logged off, the ISP access manager 94 retains the user's ID and password information so that this information need not be reentered each time additional information is requested from a WWW site.

To accommodate instances where a user wants to transfer a file or files to the ISP server 80, the browser program 100 will send a connection request directly to the ISP access manager 94. For example, if a user wants to send e-mail messages, they must be transmitted through one of the transmission links 50 to the ISP server 80. In this circumstance, when the user "sends" the e-mail message or messages, the browser program 100 automatically sends a connection request to the ISP access manager 94 which connects the user through one of the transmission links or channels 50 to the next available interface port 20. As before, after the messages have been sent to the ISP server 80, the ISP access manager computer 90 causes the transmission link 50 to be disconnected if additional messages are not sent or additional information is not requested within a predetermined period of time.

In summary, the present invention substantially reduces the connection time between a user and the ISP server during an Internet session by establishing the transmission link only when the ISP server is ready to download requested information to the user. This is accomplished by transmitting all user information requests to the ISP server through the signaling link instead of through the transmission link as is done in prior conventional networks. The substantial connect time during which the ISP server is either retrieving requested information from a WWW site, or is waiting for the user to request additional information, is thereby eliminated through use of the present invention.

Although the invention has been disclosed in terms of a preferred embodiment, it will be understood that numerous variations and modifications could be made thereto without departing from the scope of the invention as defined in the following claims. For example, although the preferred embodiment is disclosed specifically for use with an SS7 signaling network including ISDN B and D channels, the invention could easily be adapted for use with any communications network which employs dedicated signaling links which are separate from voice and data transmission links.

What is claimed is:

1. A system for managing access of users to the Internet comprising:
   a) an intelligent telecommunications network including:
      1) a plurality of switching nodes;
      2) a plurality of transmission links for interconnecting said plurality of switching nodes;
      3) a service control point for selectively interconnecting said plurality of switching nodes with selected ones of said plurality of transmission links;
      4) a plurality of signaling control links for transmission of signaling information between said service control point and each of said switching nodes;
   b) an Internet service provider (ISP) server connected to one of said switching nodes;
   c) a plurality of user computers connected, one each, to different ones of said plurality of switching nodes, each of said user computers including means for communicating Internet connection requests through a corresponding one of said signaling links to said service control point; and
   d) an ISP access manager connected to said ISP server for receiving Internet connection requests from said user computers through said signaling control links and said service control point, and supplying said connection requests to said ISP server, said access manager further including means for instructing said service control point to cause said ISP server to be interconnected to said plurality of user computers through corresponding ones of said transmission links.

2. The system of claim 1, wherein said access manager further includes means for instructing said service control point to cause said corresponding transmission link to be disconnected if said user computer has not requested information from said server within a predetermined period of time.

3. The system of claim 2, wherein said predetermined period of time is variable from user to user.

4. The system of claim 1, wherein said access manager is formed integrally with said service control point.

5. The system of claim 4, wherein said service control point comprises a communications computer system, and said access manager comprises a software module in said communications computer system.

6. The system of claim 1, wherein said intelligent telecommunications network is based upon Signaling System 7.

7. The system of claim 6, wherein each of said transmission links is an ISDN B channel, and each of said signaling links comprises an ISDN D channel.

8. The system of claim 1, wherein said access manager is connected to said ISP server by means of a local area network connection.

9. The system of claim 1, wherein each of said user computers further includes means for sending a request to said access manager to connect said user computer to said ISP server with one of said transmission links in response to a request entered by a user to send an information file to said ISP server.

10. The system of claim 1, wherein said intelligent communications network further includes at least one central office for receiving Internet connection requests from said user computers, said central office including means for detecting Internet connection requests and diverting said requests to said service control point for processing.

11. The system of claim 1, wherein said ISP access manager further includes means for 1) instructing said ISP server to retrieve information requested by one of said user computers from an Internet site, and 2) instructing said service control point to cause at least one of said transmission links to be connected between said ISP server and said one of said user computers after said ISP server has retrieved said information, and is ready to download said information to said one of said user computers.

12. The system of claim 1, wherein said ISP access manager includes means for receiving and validating logon requests received from said user computers through said signaling links.

13. A method for managing access of users to the Internet comprising the steps of:
   a) providing a transmission link and a signaling link for selectively interconnecting a user computer to an Internet service provider (ISP) server;
   b) initiating an Internet session between said user computer and said ISP server by transmitting an Internet connection request to said ISP server through said signaling link; and
   c) connecting said ISP server to said user computer through said transmission link in response to said Internet connection request.

14. The method of claim 13, further comprising the step of:
   d) disconnecting said transmission link if an information request is not received from said user computer within a predetermined period of time.

15. The method of claim 13, wherein said step of connecting further comprises:
   1) transmitting a request for information to said ISP server through said signaling link;
   2) causing said ISP server to retrieve said information from a remote site;
   3) connecting said ISP server to said user computer through said transmission link after said ISP server has retrieved said information; and
   4) downloading said information from said ISP server to said user computer.

16. The method of claim 15, further comprising the step of:
   d) disconnecting said transmission link if an additional information request is not received from said user computer within a predetermined period of time.

17. The method of claim 16, wherein said predetermined period of time is selected based upon a usage profile of said user.

18. The method of claim 13, wherein said step of initiating an Internet session further comprises:
   1) providing an ISP access manager for selectively connecting said ISP server to said user computer through said transmission link;

2) transmitting said Internet connection request through said signaling link to said access manager; and
3) processing said Internet connection request with said access manager.

19. A method for managing access of users to the Internet comprising the steps of:
a) providing a transmission link and a signaling link for selectively interconnecting a user computer to an Internet service provider (ISP) server;
b) Internet connection request for first information located at a remote site from said user computer to said ISP server through said signaling link;
c) retrieving said first information from said remote site to said ISP server;
d) connecting said ISP server to said user computer through said transmission link; and
e) downloading said first information from said ISP server to said user computer through said transmission link.

20. The method of claim 19, further comprising the step of:
f) disconnecting said transmission link if an additional information request is not received from said user computer within a predetermined period of time following downloading of said first information from said ISP server to said user computer.

* * * * *